United States Patent [19]
Yubazaki et al.

[11] Patent Number: 5,270,597
[45] Date of Patent: Dec. 14, 1993

[54] FOUR PHASE STEPPING MOTOR AND ART OF DRIVING SAME

[75] Inventors: Naoyoshi Yubazaki; Mitsuo Kimura; Eiichi Kitamura, all of Kyoto, Japan

[73] Assignee: Mycom Kabushiki Kaisha, Kyoto, Japan

[21] Appl. No.: 15,846

[22] Filed: Feb. 10, 1993

[30] Foreign Application Priority Data

May 14, 1992 [JP] Japan .................. 4-148474

[51] Int. Cl.⁵ .................. H02K 37/00
[52] U.S. Cl. .................. 310/49 R; 318/68 J
[58] Field of Search .......... 310/49 R, 162, 163, 310/164, 68 R, 131, 132; 318/781, 254, 68 J

[56] References Cited
U.S. PATENT DOCUMENTS

| | | | |
|---|---|---|---|
| 4,717,898 | 1/1988 | Cappelli | 310/49 R X |
| 4,792,709 | 12/1988 | Smith et al. | 310/49 R |
| 4,855,629 | 8/1989 | Sato | 310/49 R |

Primary Examiner—Steven L. Stephan
Assistant Examiner—E. To
Attorney, Agent, or Firm—Armstrong, Westerman, Hattori, McLeland & Naughton

[57] ABSTRACT

The stepping motor has 16 stoppable points of a rotor to be driven by a stator controlled by a drive control unit which is connected to one DC source, wherein the stator comprises four (4) phase coils: an A phase coil and an inverse A phase coil, and a B phase coil and an inverse B coil, and each coil has a first terminal at a first end and a second terminal at a second end, and a first stator pole is wound with the A phase coil and the inverse A coil and a second pole is wound with the B phase coil and the inverse B coil, and these poles are disposed alternately to surround the rotor and activated to generate torque for rotating the rotor with stoppable motion at 16 points during one encircling, wherein the drive unit sequentially shifts the DC current in direction and amount to produce, at the rotor, composite torque vectors having revolutional loci.

3 Claims, 10 Drawing Sheets

617

618

619

620

FOUR PHASE STEPPING MOTOR AND ART OF DRIVING SAME

FIELD OF THE INVENTION

This invention relates to a four (4) phase stepping motor which performs one revolution or one encircling in terms of electrical angle through 16 stoppable steps by electrical activation and deactivation, and also to an apparatus and a method for driving the same.

BRIEF DESCRIPTION OF THE DRAWINGS

For the convenience in explaining the related art with reference to drawings, the brief summary of the drawings is stated at this position.

These drawings are presented to illustrate the invention, and therefore these should not be construed as limiting the invention.

DESCRIPTION OF THE RELATED ART

Figure 9:
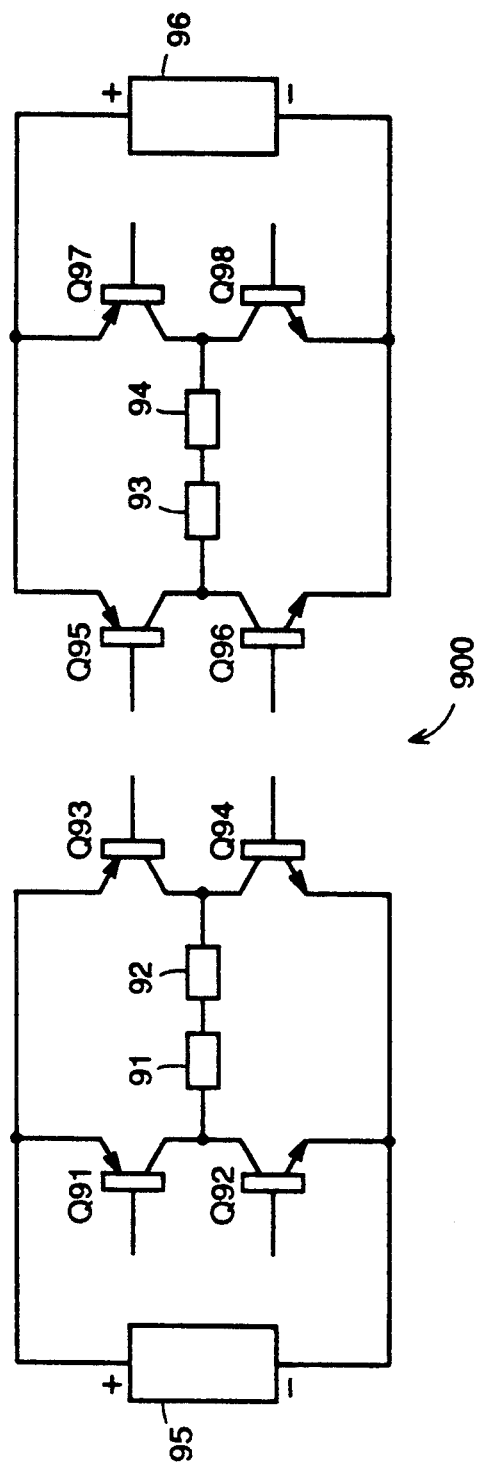
FIG. 9 is a circuit diagram for explaining a conventional version of the four phase stepping motor.
Figure 10:
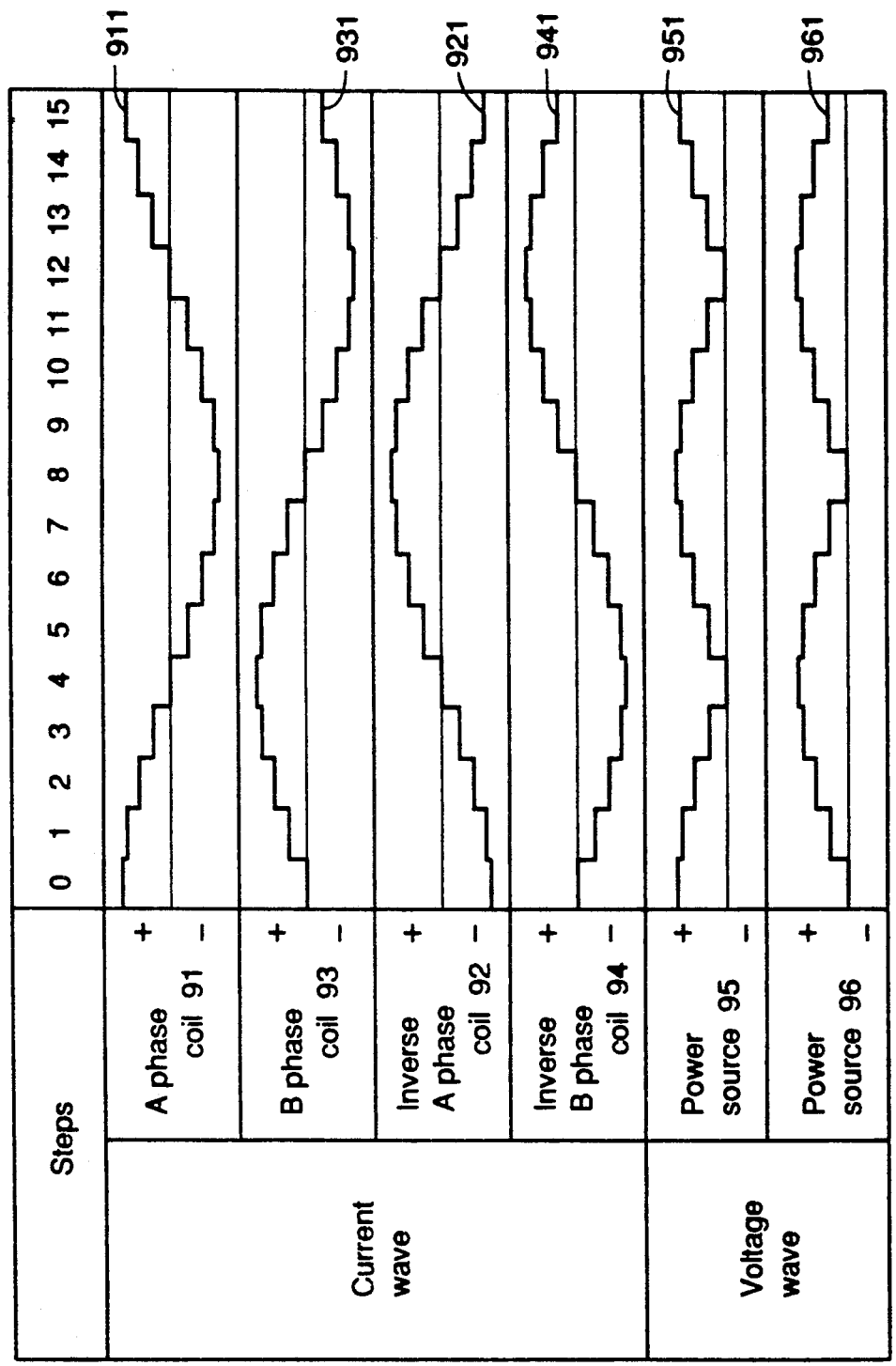
FIG. 10 is the time course chart for a conventional four phase stepping motor which shows current conductions across phase coils relative to voltages applied from sources.

With reference to FIGS. 9 and 10, the related art will be described. As shown therein, the conventional four phase stepping motor 900 is provided with an A phase coil 91 and an inverse A phase coil 92 which generate torques to act a rotor in reverse directions mutually, and also with a B phase coil 93 and an inverse B phase coil which generate torques to act the rotor in reverse directions mutually. Further herein on a stator, a pole wound with the A phase coil 91 and a pole wound with the inverse A phase coil 92, and also a pole wound with the B phase coil 93 and a pole wound with the inverse B phase coil 94 are arranged alternately to surround the center rotor (not shown).

A first terminal of each of the A phase coil 91 and the inverse A phase coil 92 is respectively connected, via transistors Q91 to Q94 arranged for switching action, to plus and minus ends of a power source 95, and a first terminal of each of the B phase coil 93 and the inverse B phase coil 94 is respectively connected, via transistors Q95 to Q98, to plus and minus ends of another power source 96. In turn, a second terminal of the A phase coil 91 is connected to a second terminal of the inverse A phase coil 92. Likewise, a second terminal of the B phase coil 93 is connected to a second terminal of the inverse B phase coil 94. Herein, each phase coil, Q91 through Q94, is designed to have the same impedance value so that each coil will provide the same magnitude of torques at the rotor when the same magnitude or amount of current is applied to respective coils.

Thus, by actions of changing the magnitudes of current to the transistors Q91 to Q98, current conductions 911, 921, 931, 941 across the phase coils Q91 to Q94 proceed through 16 steps. Thus one cycle is performed as shown in FIG. 10 and thereby the rotor of the four phase stepping motor 900 is actuated to rotation. As noted above, each coil 91 to 94 has the same impedance and accordingly voltages to be applied to each phase coil 91 to 94 is proportional to magnitudes of the current to be applied, so that the changes in voltage 951 which the DC source 95 should apply to both the A phase coil 91 and the inverse A phase coil 92 through the stages, and the changes in voltage 961 which the DC source 96 should apply to both the B phase coil 93 and the inverse B phase coil 94, are determined as also shown in FIG. 10. In review of the voltage graphs by the sources 95, 96 in FIG. 10, it is found that through 16 steps (numbered 0 to 15), at even number steps the voltage 951 and the voltage 961 are the same, that is, the source 95 and the source 96 are required to produce the same voltage, and that at odd number steps the voltages 951, 961 are different, that is, the sources 95, 96 are required to produce two different voltages. Herein at 0 and 8 steps the transistors Q95 to Q98 are not activated and accordingly a difference in the voltage requirements does not matter, and similarly at 4 and 12 steps the transistors Q91 to Q94 are not activated and accordingly a difference does not matter.

However, the difference in required voltages persists at odd number steps. This factor that different voltages are requisite at odd number steps causes the DC source 95 and the DC source 96 to be different, separate ones or unable to be merged. That is, in the art of a conventional four phase stepping motor which performs one cycle through 16 steps by activating respective phase coils 91 to 94, and its related drive apparatus and drive method, two DC sources are required, and this requirement has made the drive apparatus so costly, complex and made difficult the advent of such a motor integrated with its drive unit, at a reasonable cost. For the actualization of driving by one power source, it is expedient to remove the odd number steps as shown in FIG. 10 from the motor 900, that is, the reduction from 16 steps to 8 steps. But this expedient motor loses accurate, exact motions with the control of electrical angles.

The present invention has been attained in view of such technical need and demand as noted above and offers the art of driving, with use of one drive means, four phase stepping motor having 16 stoppable points during one encircling of a rotor, wherein said one drive means is integrated with the motor. Hence with less cost and more convenience in handling, and high performance. Other advantages will be apparent as the description proceeds.

SUMMARY OF THE INVENTION

The summary will be stated in three parts to refer to the motor, drive apparatus, and drive method as below:

A first part of the present invention provides a four phase stepping motor having 16 stoppable points of a rotor to be driven by a stator controlled by a drive control unit which uses one DC current supply, wherein said stator comprises: an A phase coil and an inverse A phase coil, and a B phase coil and an inverse B coil each having a first terminal at a first end and a second terminal at a second end; and a first pole wound with the A phase coil and the inverse A coil and a second pole wound with the B phase coil and the inverse B coil are disposed alternately, and thereby activating these coils to generate torque for rotating the rotor with stoppable motion at 16 points during one encircling;

said drive control unit includes a combination of semiconductor switching devices for opening/closing connections between an output end of the source and the first terminals of respective coils, that is, activating/deactivating the phase or excitor coils; wherein the second terminals of the respective coils are mutually connected; and the A phase coil and the inverse A phase coil are wound around the first pole such that a torque produced at the rotor by current conducting from the first terminal to the second terminal of the A phase coil is directionally opposite to a torque produced at the rotor by current conducting from the first terminal to the second terminal of the inverse A phase coil; and the B phase coil and the inverse B phase coil are wound around the second pole such that a torque produced at the rotor by current conducting from the first terminal to the second terminal of the B phase coil is directionally opposite to a torque produced at the rotor by current conducting from the first terminal to the second terminal of the inverse B phase coil;

whereby current conduction is controlled to route 16 steps as one cycle with sequential shifting in direction and amount of the current to produce at the rotor composite torque vectors having revolutional loci.

A second part of the present invention provides a drive apparatus for a four phase stepping motor having 16 stoppable points of a rotor to be driven by a stator controlled by a drive control unit which uses one DC supply, wherein said stator of the motor comprises:

an A phase coil and an inverse A phase coil, and a B phase coil and an inverse B coil each having a first terminal at a first end and a second terminal at a second end; and a first pole wound with the A phase coil and the inverse A coil and a second pole wound with the B phase coil and the inverse B coil are disposed alternately, and thereby activating these coils to generate torque for rotating the rotor with stoppable motion at 16 points during one encircling;

said drive apparatus comprises a drive control unit which includes a combination of semiconductor switching devices for opening/closing connections between an output end of the source and the first terminals of respective coils, that is, activating/deactivating the excitor coils; and wherein said drive control unit comprises:

a first semiconductor switching device for controlling connection between the first terminal of the A phase coil and a plus end of the electrical source; a second semiconductor switching device for controlling connection between the first terminal of the A phase coil and a minus end of the electrical source; a third semiconductor switching device for controlling connection between the first terminal of the inverse A phase coil and the plus end of the electrical source; a fourth semiconductor switching device for controlling connection between the first terminal of the inverse A phase coil and the minus end of the electrical source; a fifth semiconductor switching device for controlling connection between the first terminal of the B phase coil and the plus end of the electrical source;

a sixth semiconductor switching device for controlling connection between the first terminal of the B phase coil and the minus end of the electrical source; a seventh semiconductor switching device for controlling connection between the first terminal of the inverse B phase coil and the plus end of the electrical source; an eighth semiconductor switching device for controlling connection between the first terminal of the inverse B phase coil and a minus end of the electrical source;

whereby current conduction is controlled by switching actions of the devices to route 16 steps as one cycle with sequential shifting in direction, including the conduction from the first terminal to the second terminal and reversal, and in amount, including a zeroing, of the current to produce at the rotor composite torque vectors having revolutional loci.

A third part of the present invention provides a method of driving a four phase stepping motor having 16 stoppable points of a rotor to be driven by a stator controlled by a drive control unit which uses one DC supply, said method comprising the steps of:

providing said stator which comprises: an A phase coil and an inverse A phase coil, and a B phase coil and an inverse B coil each having a first terminal at a first end and a second terminal at a second end; and a first pole wound with the A phase coil and the inverse A coil and a second pole wound with the B phase coil and the inverse B coil being disposed alternately, and thereby activating these coils to generate torque for rotating the rotor with stoppable motion at 16 points during one encircling;

providing said drive control unit which includes a combination of semiconductor switching devices for opening/closing connections between an output end of the source and the first terminals of respective coils, that is, activating/deactivating the phase or excitor coils; wherein the second terminals of the respective coils are mutually connected; and the A phase coil and the inverse A phase coil are wound around the first pole such that a torque produced at the rotor by current conducting from the first terminal to the second terminal of the A phase coil is directionally opposite to a torque produced at the rotor by current conducting from the first terminal to the second terminal of the inverse A phase coil; and the B phase coil and the inverse B phase coil are wound around the second pole such that a torque produced at the rotor by current conducting from the first terminal to the second terminal of the B phase coil is directionally opposite to a torque produced at the rotor by current conducting from the first terminal of the inverse B phase coil;

providing a current control by said current control unit for routing 16 steps numbered 0 to 15, as one cycle with sequential shifting in directions and amount of the current to produce at the rotor composite torque vectors having revolutional loci;

wherein at 0, 4, 8, and 12 steps, two phase coils of the four phase coils are activated and remnant two phase coils are deactivated; at 2, 6, 10, 14 steps, all of the four phase coils are activated with ½ rated current; and at all other odd number steps, one phase coil of the four phase coils is activated with rated current and two phase coils thereof are activated with ½ rated current, and a remnant one phase coil is deactivated, and wherein the definitions are provided;

direct current which conducts across each device from the first terminal to the second terminal in a same amount as the source current is defined as plus rated current, direct current which conducts across each device from the first terminal to the second terminal in ½ amount of the source current is defined as plus ½ rated current, direct current which conducts across each device from the second terminal to the first terminal in a same amount as the source current is defined as minus rated current, direct current which conducts across each device from the second terminal to the first terminal in ½ amount of the source current is defined as minus ½ rated current; and for the convenience in expressions herein, the plus and minus rated currents are simplified to the rated current, and the plus and minus ½ rated current are simplified to the ½ rated current.

DESCRIPTION OF THE EMBODIMENT(S) OF THE PRESENT INVENTION

Figure 3:
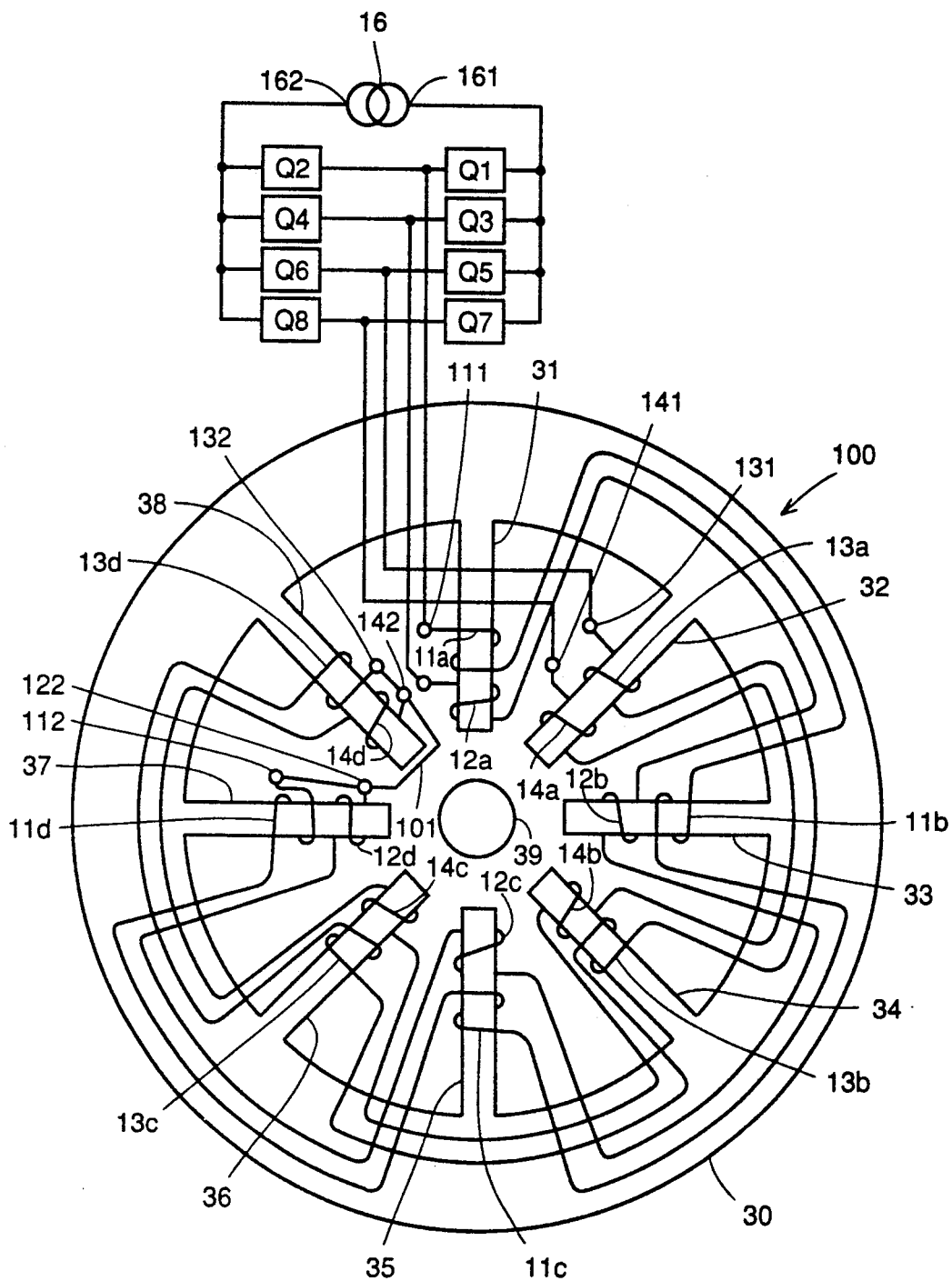
FIG. 3 is a schematic sectional view of the four phase stepping motor.

In the following, a preferred embodiment of the present invention will be described with reference to the drawings and for the convenience in illustrating the invention, a stepping motor having eight (8) stator poles for producing four (4) magnetic phases will be taken up as an example herein. As FIG. 3 shows, the motor 100 includes a stator having eight (8) poles 31-38 with no teeth at each tip (the drawing is not detailed) and a rotor 39 having teeth on its circumferential face (but the drawing is not so detailed). A pole 31 is wound with excitor coils 11a, 12a, a pole 33 (not pole 32, alternation) is similarly wound with excitor coils 11b, 12b, a pole 35 is with excitor coils 11c, 12c, a pole 37 is with excitor coils 11d, 12d. And a pole 32 is wound with excitor coils 13a, 14a, a pole 34 is with excitor coils 13b, 14b, a pole 36 is with excitor coils 13c, 14c, a pole 38 is with excitor coils 13d, 14d.

Figure 2:
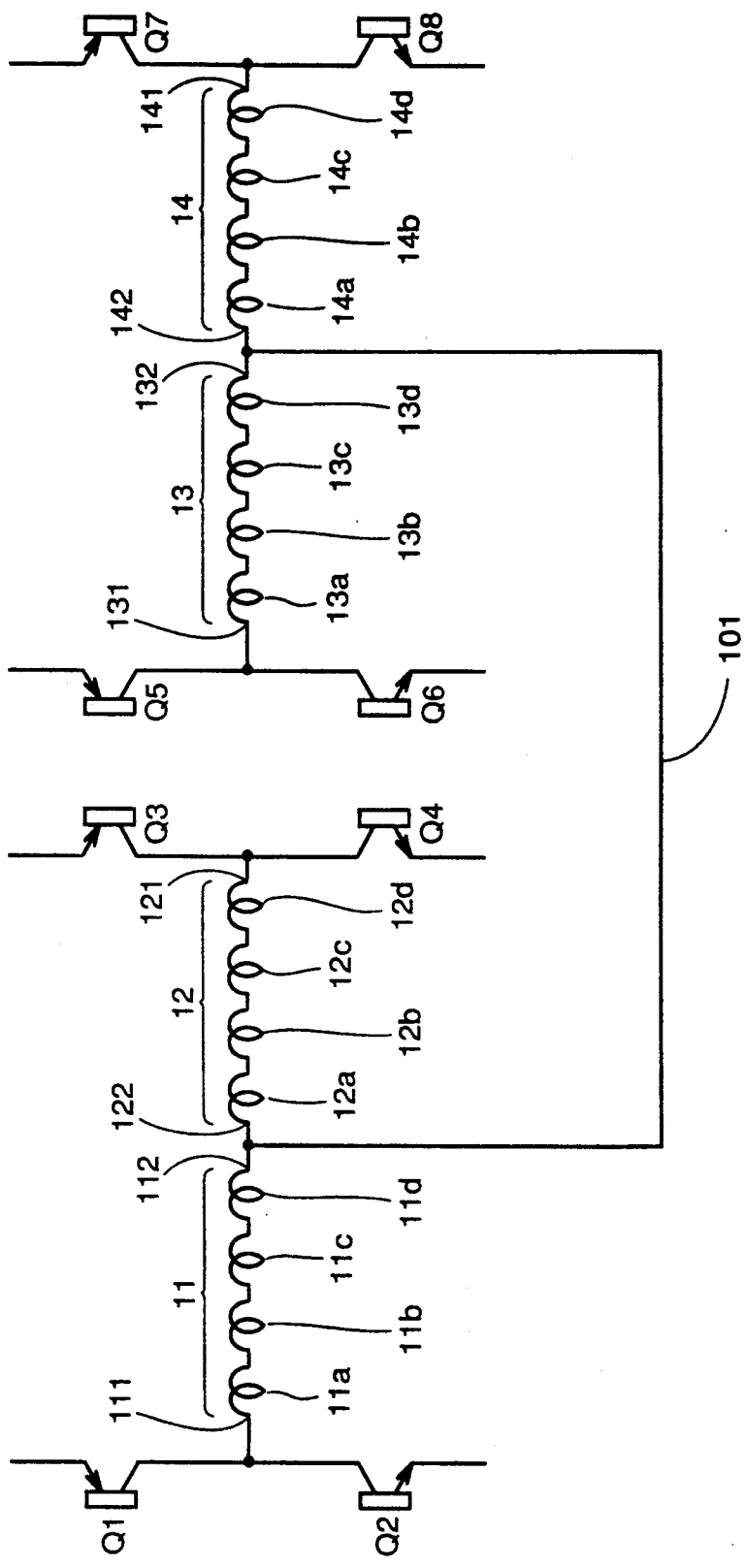
FIG. 2 is a circuit diagram which is detailed in part of FIG. 1.

As is seen from FIGS. 2 and 3, the coils 11a to 11d are connected in series to form the A phase coil 11, the coils 12a to 12d are similarly connected in series to form the inverse A phase coil 12, the coils 13a to 13d are in series to form the B phase coil 13, and the coils 14a to 14d are in series to form the inverse B phase coil 14, wherein each phase coil 11-14 has the same impedance value and therefore, conduction across any coils 11-14 with the same magnitude of current produces the same magnitude of torque at the rotor 39, wherein a reversal of current direction across each coil 11-14 results in reversal in direction of the torque produced at the rotor 39.

As shown in FIG. 2, the A phase coil 11 has a first terminal 111 and a second terminal 112, the inverse A phase coil 12 has a first terminal 121 and a second terminal 122, the B phase coil 13 has a first terminal 131 and a second terminal 132, in turn the inverse B phase coil 14 has a first terminal 141 and a second terminal 142.

As for winding direction herein, coil winding of the A phase coil 11 and the inverse A phase coil 12, that is, the winding direction at the poles 31, 33, 35, 37 is chosen so that the torque produced at the rotor 39 by conduction across the A phase coil 11 from the terminal 111 to the terminal 112 has a direction opposite to that of the torque produced at the rotor 39 by conduction across the inverse A phase coil 12 from the terminal 121 to the terminal 122. Further, coil winding of the B phase coil 13 and the inverse B phase coil 14, that is, the winding direction at the poles 32, 34, 36, 38 is chosen so that the torque produced at the rotor 39 by conduction across the B phase coil 13 from the terminal 131 to the terminal 132 has a direction opposite to that of the torque produced at the rotor 39 by conduction across the inverse B phase coil 14 from the terminal 141 to the terminal 142.

Referring further to connections between the coils herein, the A coil second terminal 112 and the inverse A coil second terminal 122 are connected, and the B coil second terminal 132 and the inverse B coil second terminal 142 are connected. And these two connecting points between the terminals 112 and 122, and between the terminals 132, 142 are further connected with a lead wire 101 as neutral line, which is different from the conventional art. That is, the second terminals of respective coils 11-14 are electrically connected mutually. In the case shown in FIG. 3, the terminals 122, 142 are connected with a lead wire 101.

Figure 1:
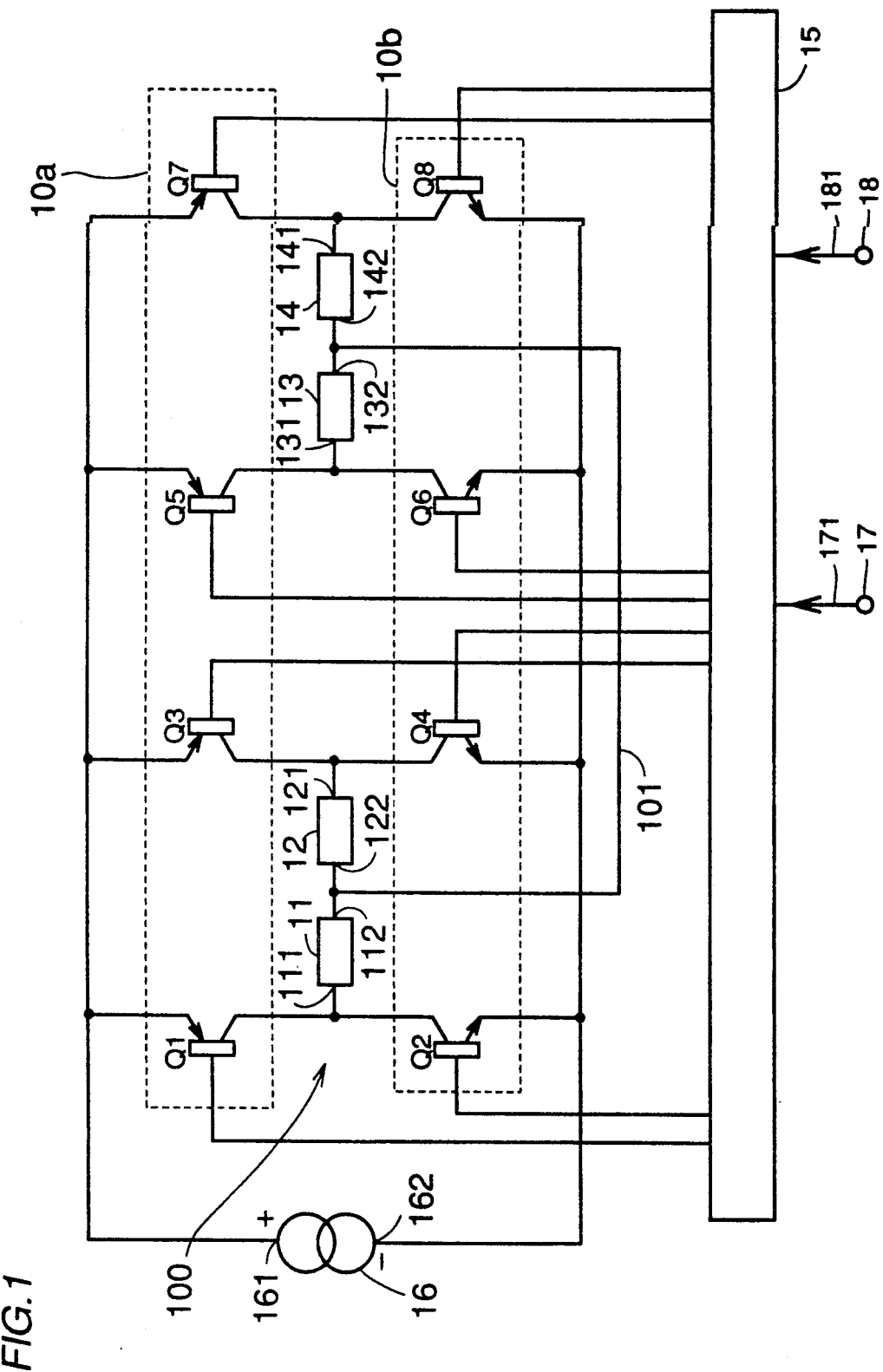
FIG. 1 is a schematic circuit diagram which shows an electrical structure of a four phase stepping motor, an embodiment of the present invention.

As seen in FIGS. 1 and 2, the A coil first terminal 111 is connected, through transistors Q1, Q2, to a plus end 161 and a minus end 162 of a power source 16. And the inverse A coil first terminal 121 is connected, through transistors Q3, Q4 to the same plus and minus ends 161, 162 of the source 16. Similarly, the B coil first terminal 131 is connected, through transistors Q5, Q6, to the plus and minus ends 161, 162 of the power source 16. And the inverse B coil first terminal 141 is connected, through transistors Q7, Q8 to the same plus and minus ends 161, 162 of the source 16.

More specifically, the A coil first terminal 111 enters both the collector of the transistor Q1 and the collector of the transistor Q2, and the inverse A coil first terminal 121 enters both the collector of the transistor Q3 and the collector of the transistor Q4. Similarly, the B coil first terminal 131 enters both the collectors of transistors Q5, Q6, and the inverse B coil first terminal 141 enters both the collectors of the transistors Q7, Q8.

Each of the transistors Q1, Q3, Q5, Q7 has the emitter connected to the plus output end 161 of the source 16, and each of the transistors Q2, Q4, Q6, Q8 has the emitter connected to the minus end 162 of the source 16. Each of eight transistors in all Q1, Q2, Q3, Q4, Q5, Q6, Q7, Q8 has the base connected to a drive control sector 15, as seen from FIG. 1. This control sector 15 has a first reception terminal 17 for timing signals 171 which regulate motions of the rotor and a second reception terminal 18 for directionality signals 181 which regulate revolutional directions of the rotor.

In the configuration as noted above, a first semiconductor group 10a is composed of the transistors Q1, Q3, Q5, Q7 which control the connection between the four phase coils 11-14 and the source output end 161, and a second semiconductor group 10b is composed of the transistors Q2, Q4, Q6, Q8 which control the connection between the four phase coils 11-14 and the source output end 162.

Figure 4:
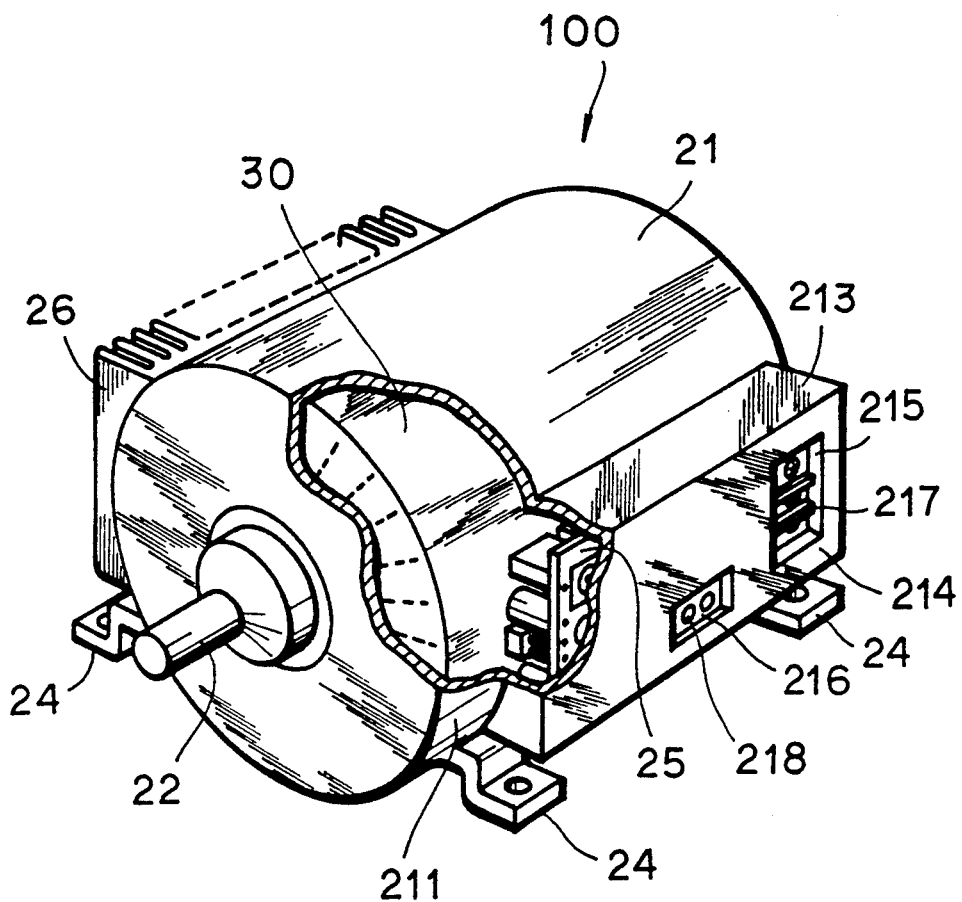
FIG. 4 is a perspective, partially cutaway, external view of the inventive motor.

Referring to FIG. 4, a perspective view of the inventive motor 100 is shown therein. As is seen, the stator 30 and a power take-off axle 22 derived from the rotor 39 (not shown) are disposed in place inside a motor cover 21 of generally cylindrical shape. Under the cover 21 there are four feet to install the motor 100.

On the one side of the motor 100, a housing case 213 is mounted in which devices affording the drive control sector 15, the source 16, other electronic circuit equipment 25 are housed. On the side panel of the case 213, two ports 215, 216 are provided. In the port 215 there is a terminal pad 217 for connecting the power source from commercial supply and in the port 216 there is a terminal pad 218 which mounts the input end 17 for timing signals 171 and the input end 18 for directionally signals 181. Further, on the other side opposite from the case 213, there is another case in which the transistors Q1 to Q8 composed of the first and second groups 10a, 10b are rested, and cooling fins 26 are formed on the cover side as seen therefrom.

Figure 5:
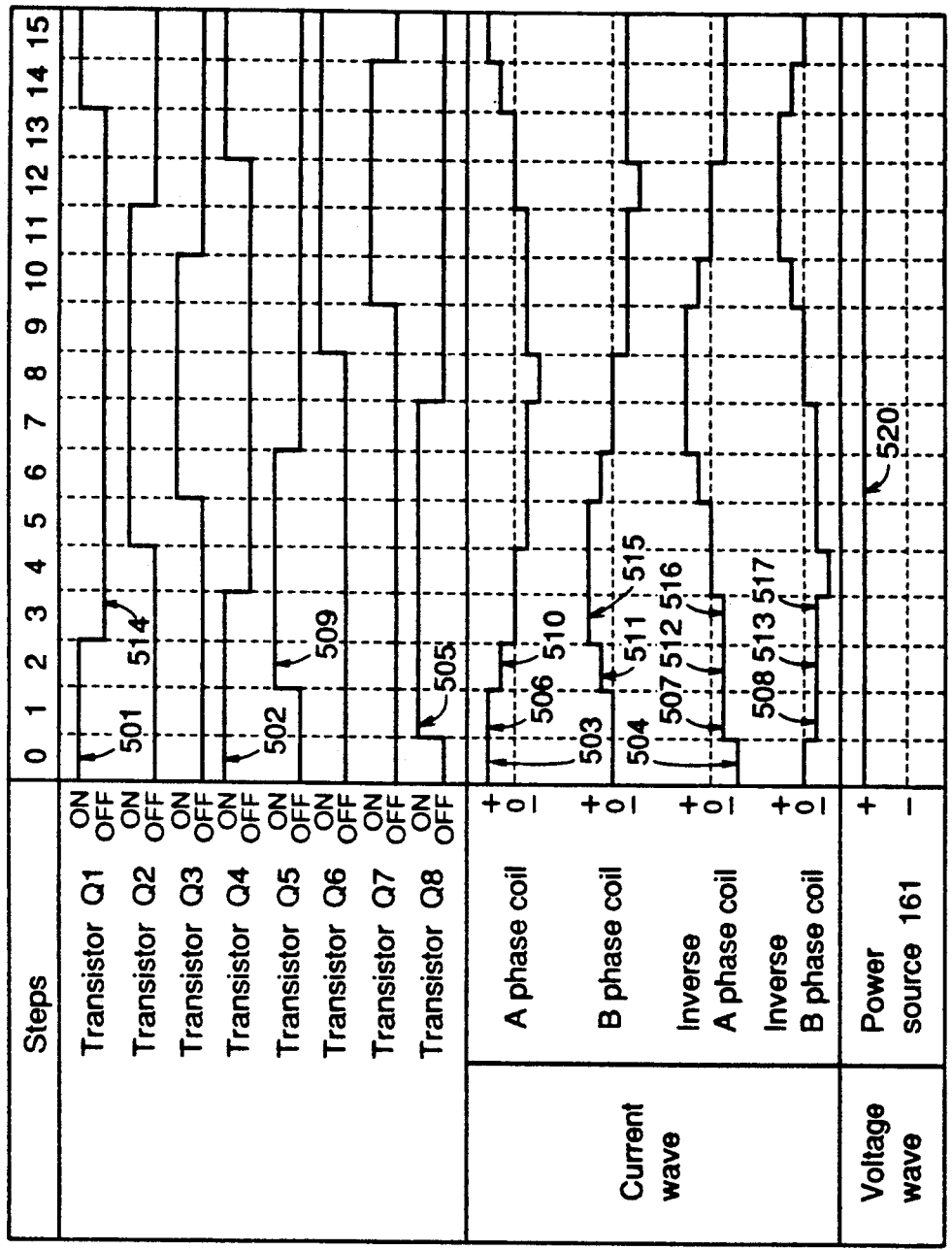
FIG. 5 is a time course chart which shows on/off states of semiconductor devices relative to states of current conductions across respective phase coils, and current amounts and voltages supplied from a DC source.

In FIG. 5 shown is a time course chart which shows on/off states of semiconductor devices Q1 to Q8 relative to states of current conduction across respective phase coils 11-14 on the rotor and voltages applied from a source through 16 steps 0-15.

Figure 8:
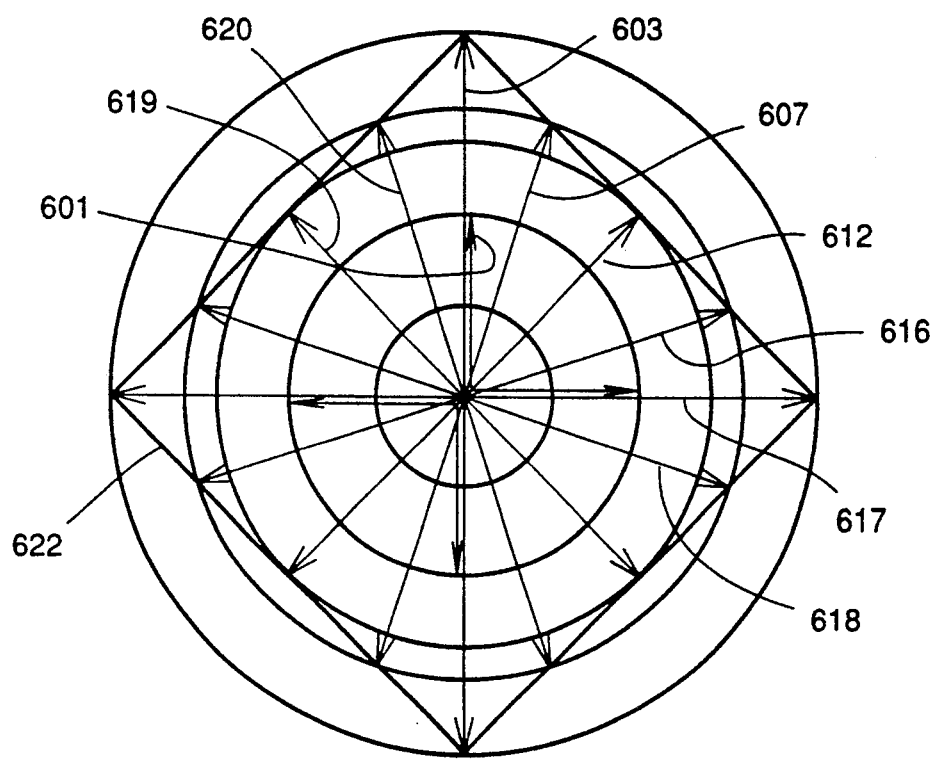
FIG. 8 is a diagram summed up for explaining the torques generated relative to phase changes.

FIGS. 6-8 show diagrams for explaining torques produced according as the phase revolves, wherein shown in FIG. 8 is a diagram summed up for explaining the composite torque produced relative to phase changes. (It is to be noted here that plus or minus designation of the current in FIG. 5 is determined which direction the conduction takes place across the coils 11-14, that is, the conduction from the first terminal to the second terminal is designated "plus" and the reverse conduction, that is, one from the second terminal to the first terminal is "minus")

Figure 6A:
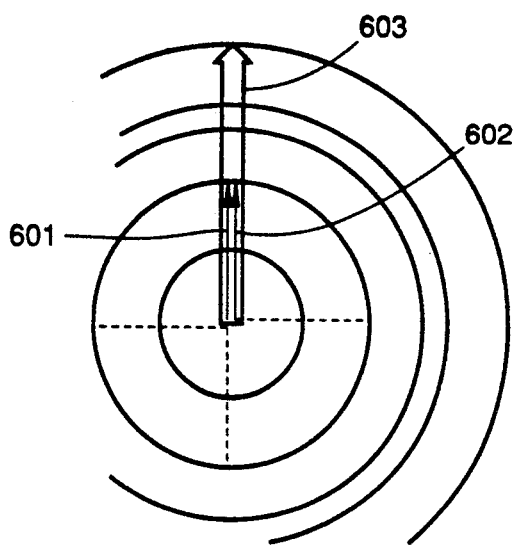
FIG. 6 includes diagrams for explaining torques generated according as the phase revolves.

Reference will be made to the operation of the four phase stepping motor 100 with reference to FIG. 5. Now it is assumed that the terminal pad 217 has been connected to the commercial AC source, of which AC current is converted into one DC current and that the terminal pad 218 has been connected to some exterior source of supplying timing signals and directionality signals. Then, when the operation starts at 0 step in FIG. 5, the drive control sector 15 sets, at this step, the transistors Q1, Q4 in ON state which is indicated by 501, 502 in FIG. 5, wherein assuming that a current amount at this step of the conduction from the source to the motor takes the rated current which is noted the current I, the current I (plus rated current) conducts across the A phase coil 11 and the current −I (minus rated current) conducts across the inverse A phase coil 12, and these two currents are designated in FIG. 5 by 503, 504. In the meantime, the current conduction across the B phase coil 13 and the inverse B phase coil 14 is made 0. Therefore, as FIG. 6(a) shows by vector representation, the torque generated at the A phase coil 11 is designated by a vector 601, and the torque generated at the inverse A coil 12 is designated by a vector 602, of which a composite vector designated 603 is obtained by composition of the two phase or component vectors 601, 602.

Theoretical approach to the outstanding stepping motor 100, though the details are abbreviated from herein, has proved that, at a revolutional point whereat the current iw conducts respective coils 11-14 and thereby the torque T generates at the rotor 39 for displacement in the angle $\theta$, the following expression (A) is given for the torque T:

$$T \approx K \times \Sigma \{iw \times \sin(n \times \theta - \phi w)\} \quad (A)$$

wherein:
K: proportional constant
n: constant to be determined by the construction of the motor 100 and equal or common with respective coils 11-14
$\phi w$: constant unique to each coil 11-14

Accordingly, the expression (A) is a representation of torque vectors by sine function with the aid of parameters of the length (or magnitude) correspondent to amplitude (K×iw) and the phase angle correspondent to argument angle ($\theta w$). And a composite vector represented in the expression (A) is also obtained by addition of the expressions for component vectors.

Figure 6B:
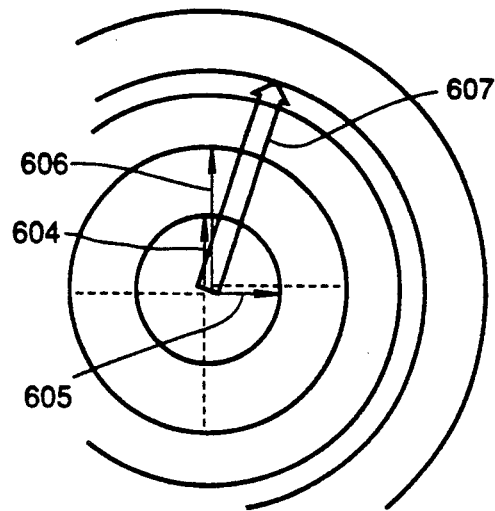

When one pulse of the timing signals 171 is inputted into the input end 17, the revolutional stage advances from step 0 to step 1, and the transistors Q1, Q4 are kept on ON state and the transistor Q8 is made ON in addition (see 505 in FIG. 5). In this state, the conduction takes place including the current I across the A phase coil 11 (see 506 in FIG. 5) and the current −½ I (minus ½ rated current) across both the inverse A phase coil 12 and the inverse B phase coil 14 (see 507, 508). Consequently, as FIG. 6(b) shows, the torque 604 generated at the inverse A phase coil 12 has the same direction as that of the vector 602 and ½ length of that of the same vector 602, and the torque 605 generated at the inverse B phase coil 14 has the same length as that of the vector 604 and the direction 90° revolved or advanced clockwise from the vector 604, and the torque 606 generated at the A phase coil 11 is the same as the vector 601 in terms of length and direction. Thus, the composite vector 607 is obtained as shown in FIG. 6(b).

Then, it is to be noted here. If an electrical angle of the vector 607 relative to the initial vector 603 is assumed to be $\theta$, $\theta$ is given as follows:

$$\theta = \arctan(-(-1/2)/(1-(-1/2))) = \arctan(\tfrac{1}{3}) = (\text{nearly equal}) \, 18.4° \, (\text{degrees}).$$

This electrical angle 18.4° is 4.1° smaller than or different from one sixteenth of one full revolution (22.5°=360°÷16). It is true that the advance for 22.5° is best in view of the basis that one encircling is composed of 16 steps, but this difference is within a deviation due to non-linearity in correspondence between an electrical angle and a mechanical angle. Hence insignificance.

Figure 6C:
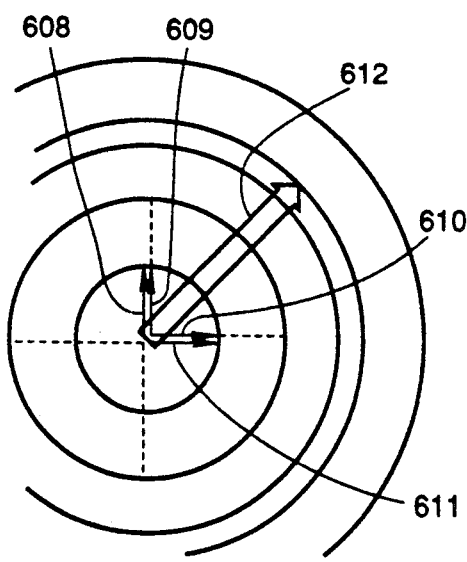

Then, the input of the next pulse renders the cycle stage to step 2, wherein the transistor Q5 is made ON (see 509). In this state, the conduction takes place including the current 1/2I (plus ½ rated current) across both the A phase coil 11 and the B phase coil 13 (see 510, 511) and the current −1/2I (minus ½ rated current) across both the inverse A phase coil 12 and the inverse B phase coil 14 (see 512, 513). Consequently, as FIG. 6(c) shows, the two torques 608, 609 generated both at the A phase coil 11 and the inverse A phase coil 12 have the same direction and the ½ length of the vector 601, and the two torques 610, 611 generated both at the B phase coil 13 and the inverse B coil 14 have the same length of the vector 608 and the direction 90° advanced clockwise from the vector 608. Thus, the composite vector 612 is produced at 45° advanced clockwise from the initial composite vector 603.

Figure 6D:
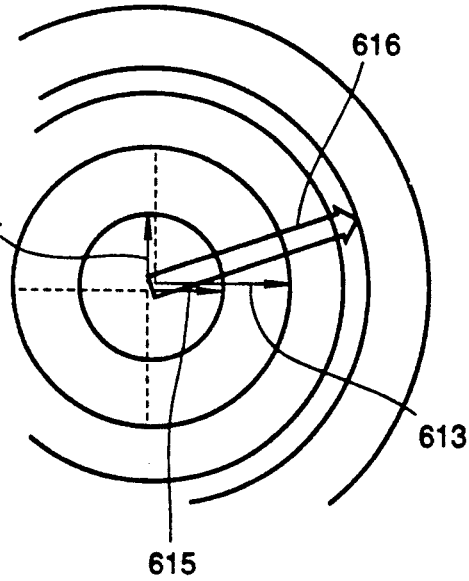
Figure 7A:
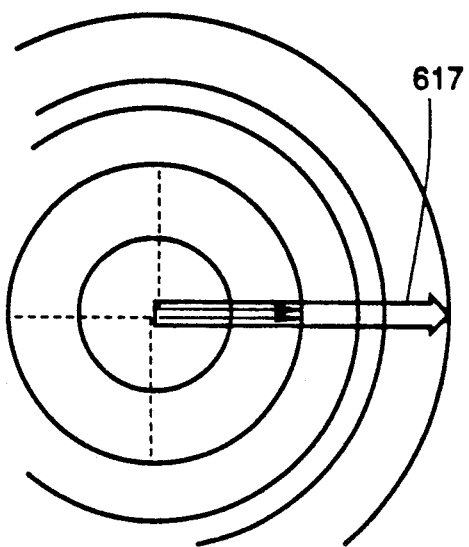
FIG. 7 includes diagrams sequential to those in FIG. 6.
Figure 7B:
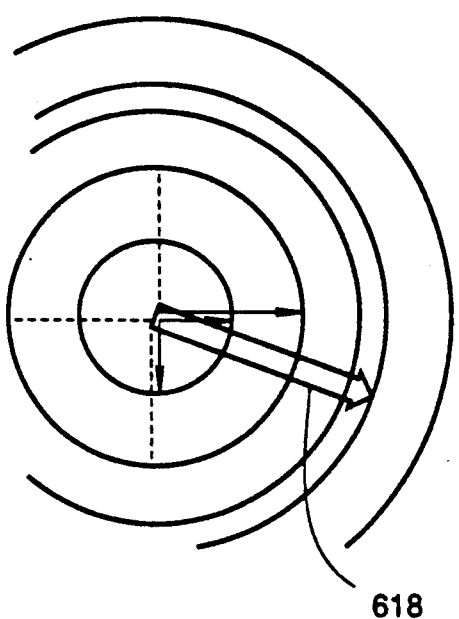
Figure 7C:
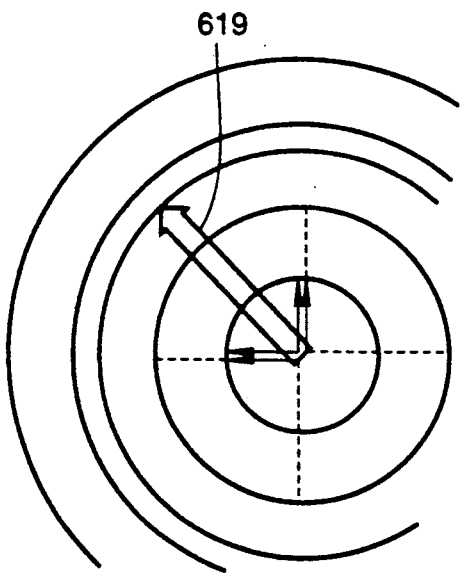
Figure 7D:
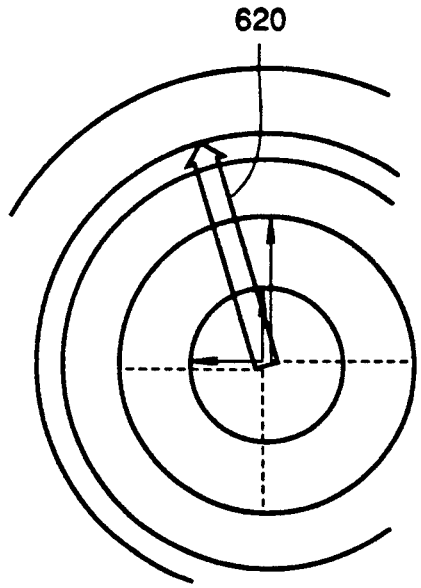

At the next stage, that is, at step 3, the transistor Q1 is made OFF (see 514), and the conduction takes place including the current I across the B phase coil 13 (see 515) and the current −1/2I across both the inverse A phase coil 12 and the inverse B phase coil 14 (see 516, 517). Consequently, as FIG. 6(d) shows, the B phase coil generates the vector 613, the inverse A phase coil 12 generates the vector 614, and the inverse B coil 14 generates the vector 615. Thus, the composite vector 616 is produced at 81.6° advanced clockwise from the initial vector 603, wherein the angular deviation from 77.5° (=22.5°×3) is little significant as noted above.

In the subsequent steps 4 through 15, the eight transistors Q1 to Q8 are controlled to proceed following prescribed ON/OFF states as FIG. 5 shows, and the conductions across the A phase coil 11, the inverse A phase coil 12, the B phase coil 13, and the inverse B phase coil 14 take place according to the states taken by the transistors as FIG. 5 also shows. Consequently, the composite torque at step 4 is determined as 617 in FIG. 7(a), and at step 5, the composite torque is as 618 in FIG. 7(b). With some abbreviation, at step 14, the composite torque is 619 in FIG. 7(c), and at step 15, the composite torque is 620 in FIG. 7(d).

Thereafter, the stage returns to step 0, that is, completing one encircling for 360° clockwise through 16 steps and in the meantime, the voltage of the DC supply is constant as shown by the linear wave 520.

The composite torque revolves as noted above, following to which the rotor 39 rotates and thus the power take-off axle 22 which is connected to the rotor 39 rotates clockwise in the same way, and if the directionality signal changes in the level, that is, if a reverse revolution is indicated, the semiconductor groups 10a, 10b changes behaviors with a result that the control stage advances from step 15 to step 0, in reverse order, thus the rotation is made counter-clockwise.

As detailed above, the four phase stepping motor 100 has the four phase coils 11-14 electrically connected by the lead wire 101 as a neutral line, wherein the transistors Q1 to Q8 operate, with the control in connection, to excite the four phase coils 11-14 in forward phase or reverse phase and thereby the current control as shown in FIG. 5 is attained, wherein since the sum of respective current conductions across the phase coils 11-14 is kept to be constant through any steps, the power source 16 is only required to keep a certain fixed voltage 520. That is, drive of the stepping motor 100 requires only one power source.

The present invention is not limited by the embodiment as described above. A modification will be explained with reference to FIG. 8. Then, FIGS. 6 and 7 show eight (8) instantaneous composite vectors 603, 607, 612, 616, 617, 618, which are collected and included into formation of sixteen (16) radiative vectors in a form of a circular diagram noted as FIG. 8, wherein the direction of the torque 601 (see FIG. 6(a)) generated by conduction across the A phase coil from the terminal 111 to 112 is assumed as reference 0°. As is seen from the diagram, the composite vectors arranged to form one cycle are not all the same in length or magnitude. That is, a locus line joining every forward end point of each vector forms a square as numbered 622. This result means that the instantaneous torques obtained by the inventive motor are not constant, but vary depending on revolutional angles. Then, if the equalization having the magnitude of the vector 603 is intended through one encircling process as a modification, an expedient to correct the variation is enabled by shifting the source current for adjustment. Specifically, assuming 16 steps clockwise starting at the composite vector 603 or from 0° angle at 0°, the adjustments of the source current are suggested as follows: at steps 4, 8, 12, no change; at steps 2, 6, 10, 14, increase the current to ca. 1.41 time; at 1, 3, 5, 7, 9, 11, 13 steps, increase the current to ca. 1.26 time. Thereby, an even circling locus having the vector 603 as radius is attained.

In the above description, the semiconductor devices for switching action are transistors, which may be bipolar type or field effect type. Further, if required current is large, thyristors are permitted to be employed. Additionally, in the above embodiment, the number of the stator poles is eight (8), but it is not limitative. A composite number based on 4 is permitted.

In the four (4) phase stepping motor and the art of driving the same as has been described herein, four phase coils are arranged each having a first terminal connected, via semiconductor switching devices, to a power source and a second terminal connected each other, and the control of switching actions of the semiconductor devices induces generation of torques to rotate the rotor, wherein with use of one power source and of the circular arrangement defined of 16 steps, the drive apparatus is made definitely simple and has enabled the manufacture of the intended motor which is integrated with the drive means.

It is to be understood that a specific embodiment has been described herein, but obviously further modification and variation of our invention is possible in light of our teachings and without departing from the spirit and scope of our invention.

What is claimed is:

1. A four phase stepping motor having 16 stoppable points of a rotor to be driven by a stator controlled by a drive control unit which uses one DC supply,
    wherein said stator comprises: an A phase coil and an inverse A phase coil, and a B phase coil and an inverse B coil each having a first terminal at a first end and a second terminal at a second end; and a first pole wound with the A phase coil and the inverse A coil and a second pole wound with the B phase coil and the inverse B coil being disposed alternately, and thereby activating these coils to produce torque for rotating the rotor with stoppable motion at 16 points during one encircling,
    said drive control unit including a combination of semiconductor switching devices for opening/closing connections between an output end of the current source and the first terminals of respective coils; wherein the second terminals of the respective coils are mutually connected; and the A phase coil and the inverse A phase coil are wound around the first pole such that a torque produced at the rotor by current conducting from the first terminal to the second terminal of the A phase coil is directionally opposite to a torque produced at the rotor by current conducting from the first terminal to the second terminal of the inverse A phase coil; and the B phase coil and the inverse B phase coil are wound around the second pole such that a torque produced at the rotor by current conducting from the first terminal to the second terminal of the B phase coil is directionally opposite to a torque produced at the rotor by current conducting from the first terminal to the second terminal of the inverse B phase coil; whereby current conduction being controlled to route 16 steps as one cycle with sequential shifting in direction and amount of the current to produce at the rotor composite torque vectors having revolutional loci.

2. A drive apparatus for a four phase stepping motor having 16 stoppable points of a rotor to be driven by a stator controlled by a drive control unit which uses one DC supply, wherein said stator of the motor comprises:
    an A phase coil and an inverse A phase coil, and a B phase coil and an inverse B coil each having a first terminal at a first end and a second terminal at a second end; and a first pole wound with the A phase coil and the inverse A coil and a second pole wound with the B phase coil and the inverse B coil being disposed alternately, and thereby activating these coils to produce torque for rotating the rotor with stoppable motion at 16 points during one encircling said drive apparatus comprising a drive control unit which includes a combination of semiconductor switching devices for opening/closing connections between an output end of the source and the first terminals of respective coils; and wherein said drive control unit comprises:

a first semiconductor switching device for controlling connection between the first terminal of the A phase coil and a plus end of the electrical source;

a second semiconductor switching device for controlling connection between the first terminal of the A phase coil and a minus end of the electrical source;

a third semiconductor switching device for controlling connection between the first terminal of the inverse A phase coil and the plus end of the electrical source;

a fourth semiconductor switching device for controlling connection between the first terminal of the inverse A phase coil and the minus end of the electrical source;

a fifth semiconductor switching device for controlling connection between the first terminal of the B phase coil and the plus end of the electrical source;

a sixth semiconductor switching device for controlling connection between the first terminal of the B phase coil and the minus end of the electrical source;

a seventh semiconductor switching device for controlling connection between the first terminal of the inverse B phase coil and the plus end of the electrical source;

an eighth semiconductor switching device for controlling connection between the first terminal of the inverse B phase coil and a minus end of the electrical source;

whereby current conduction is controlled by switching actions of the devices to route 16 steps as one cycle with sequential shifting in direction, including the conduction from the first terminal to the second terminal and reversal, and in amount, including a zeroing, of the current to produce at the rotor composite torque vectors having revolutional loci.

3. A method of driving a four phase stepping motor having 16 stoppable points of a rotor to be driven by a stator controlled by a drive control unit which uses one DC supply, said method comprising the steps of: providing said stator which comprises: an A phase coil and an inverse A phase coil, and a B phase coil and an inverse B coil each having a first terminal at a first end and a second terminal at a second end; and a first pole wound with the A phase coil and the inverse A coil and a second pole wound with the B phase coil and the inverse B coil being disposed alternately, and thereby activating these coils to produce torque for rotating the rotor with stoppable motion at 16 points during one encircling;

providing said drive control unit which includes a combination of semiconductor switching devices for opening/closing connections between an output end of the current source and the first terminals of respective coils; wherein the second terminals of the respective coils are mutually connected; and the A phase coil and the inverse A phase coil are wound around the first pole such that a torque produced at the rotor by current conducting from the first terminal to the second terminal of the A phase coil is directionally opposite to a torque produced at the rotor by current conducting from the first terminal to the second terminal of the inverse A phase coil; and the B phase coil and the inverse B phase coil are wound around the second pole such that a torque produced at the rotor by current conducting from the first terminal to the second terminal of the B phase coil is directionally opposite to a torque produced at the rotor by current conducting from the first terminal of the inverse B phase coil;

providing a current control by said drive control unit for routing 16 steps, numbered 0 to 15, as one cycle with sequential shifting in direction and amount of the current to produce at the rotor composite torque vectors having revolutional loci;

wherein at 0, 4, 8, and 12 steps, two phase coils of the four phase coils are activated and remnant two phase coils are deactivated; at 2, 6, 10, 14 steps, all of the four phase coils are activated with ½ rated current; and at all other odd number steps, one phase coil of the four phase coils is activated with rated current and two phase coils thereof are activated with ½ rated current, and a remnant one phase coil is deactivated, and wherein the definitions are provided;

direct current which conducts across each device from the first terminal to the second terminal in a same amount as the source current is defined as plus rated current, direct current which conducts across each device from the first terminal to the second terminal in ½ amount of the source current is defined as plus ½ rated current, direct current which conducts across each device from the second terminal to the first terminal in a same amount as the source current is defined as minus rated current, direct current which conducts across each device from the second terminal to the first terminal in ½ amount of the source current is defined as minus ½ rated current, and for the convenience in expressions herein, the plus and minus rated currents are simplified to the rated current, and the plus and minus ½ rated current are simplified to the ½ rated current.

* * * * *